G. W. SWIFT, Jr.
ROTARY PUNCHING MECHANISM.
APPLICATION FILED APR. 1, 1915.
1,202,122.
Patented Oct. 24, 1916.
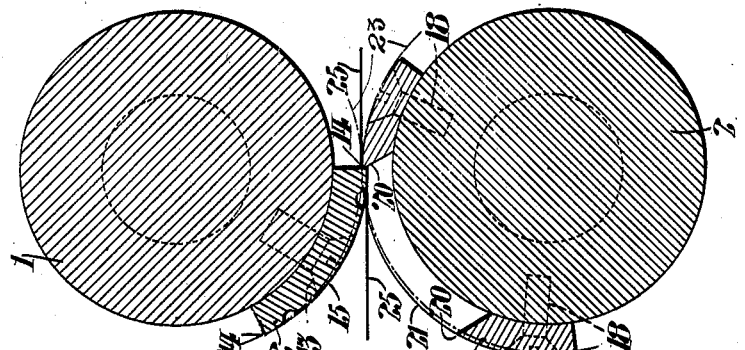
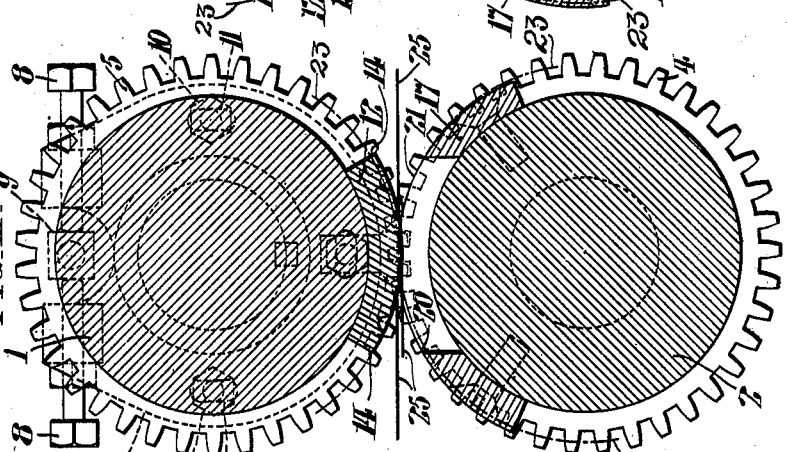
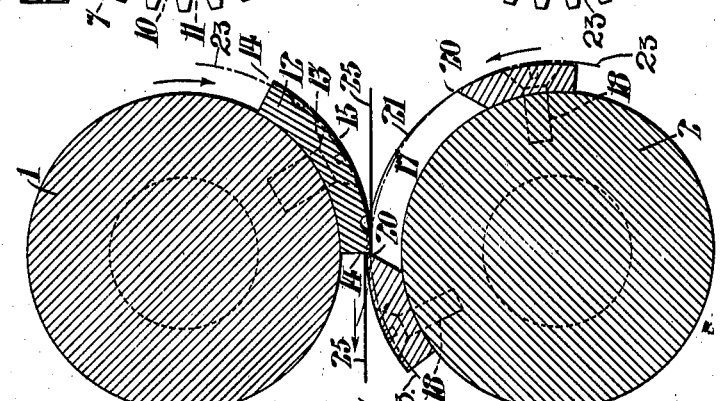
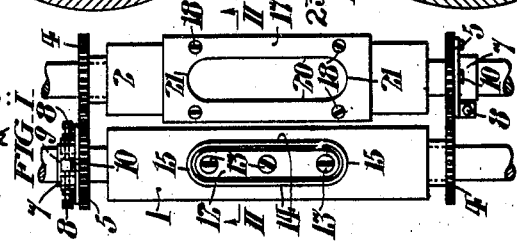
WITNESSES:
Frank E. Paige
Philip W. Vessey
INVENTOR:
George W. Swift Jr.
by Arthur E. Paige
Attorney

UNITED STATES PATENT OFFICE.

GEORGE W. SWIFT, JR., OF BORDENTOWN, NEW JERSEY.

ROTARY PUNCHING MECHANISM.

1,202,122.  Specification of Letters Patent.  Patented Oct. 24, 1916.

Application filed April 1, 1915. Serial No. 18,610.

*To all whom it may concern:*

Be it known that I, GEORGE W. SWIFT, Jr., a citizen of the United States, residing at Bordentown, in the State of New Jersey, have invented a certain new and useful Improvement in Rotary Punching Mechanism, whereof the following is a specification, reference being had to the accompanying drawing.

My invention, in the form hereinafter described, is designed for cutting openings in paper webs, and particularly openings which subsequently appear in what are known as "open face envelops", the blanks for which are formed from said web so that one opening is provided in each blank. However, it is to be understood that my invention is not restricted to such an embodiment, but may be used with other forms of rotary punching mechanism and for other purposes.

To effect a clean cutting action between the male and female die elements of such mechanism, it is necessary for them to overlap with a shearing action, and as said elements are respectively carried by different rolls, of course, either, or both, must project radially beyond the circular pitch line between said rolls and, as ordinarily constructed, either or both of said elements are allowed to project uniformly radially beyond the pitch line, and consequently, in order to prevent interference between the overlapping edges, thus arranged, it is necessary to allow back-lash to such an extent that it is impossible to secure a clean cutting action at all regions of the cut edges of the fabric which is being punched; and the difficulty is aggravated if the die elements include cutting edges which are parallel with the axes of rotation of the respective rolls, in addition to cutting edges which extend transversely with respect to said axes, circumferentially with respect to said rolls, because of the necessity for a substantial overlapping of said parallel cutting edges to insure the proper cutting action.

I have discovered that proper cutting action between rotary die elements having cutting edges extending both parallel with their axes of rotation and transversely circumferentially thereto, may be secured, without back-lash, by having the cutting edges of each die element substantially coincident with the pitch line at one end of their circumferential extent, and of greater radial projection at their other ends; the cutting edges of one die which are substantially coincident with the pitch line being apposed to the cutting edges of the other die which project radially beyond the pitch line and, preferably, the cutting edges of the male die element are substantially coincident with said pitch line at their circumferentially front ends and of greater radial extent at their rear ends; the cutting edges of the female die, to coöperate therewith, being substantially coincident with said pitch line at their rear ends and of greater radial extent at their front ends.

My invention includes the various novel features of construction and arrangement hereinafter more definitely specified.

In the drawings; Figure I is a fragmentary elevation of a pair of rotary punching rolls having their axes parallel and embodying a convenient form of my invention adapted for punching openings in webs of paper of similar fabric, subsequently utilized to form open face envelops. Figs. II, III and IV are transverse sectional views of said pair of rolls, section being taken on the line II, II indicated in Fig. I; Fig. II showing the first encounter of the die elements, at the circumferentially front ends of their cutting edges; Fig. III showing the coöperative relation of the apposed cutting edges intermediate of their length; and Fig. IV showing the last encounter of said cutting edges, at their circumferentially rear ends; in Figs. II and IV, the intermeshing gears have been omitted for the sake of clearness.

In said figures; the two rolls 1 and 2 have their axes parallel and each has at one end a gear 4 rigidly connected therewith and, at the other end, a gear 5 capable of rotary adjustment, conveniently by means including, on each roll, a collar 7 which is rigidly connected therewith and carries two set screws 8 adjustable in opposition to each other transversely with respect to the axis of the roll, so arranged as to engage, between their proximal ends, the projection 9 on the adjacent adjustable gear 5, said adjustable gears 5 on each of said rolls 1 and 2 being intermeshed, may be oppositely rotarily adjusted not only to prevent back-lash but subject said rolls to torsional strain to such a degree as to minimize or entirely eliminate lost motion between said rolls 1 and 2. When thus adjusted, said gears 5 may be rigidly connected with their respective rolls by the screws 10 which extend through slots 11 in said gears 5 in screw threaded engagement with said collars 7. Said roll 1 carries the male die element 12 which is conveniently detachably connected therewith by the screws 13 and includes cutting edges 14 extending parallel with the axis of said roll 1, and cutting edges 15 extending circumferentially transversely to said axis. Said roll 2 carries the female die element 17, conveniently detachably secured thereon by the screws 18 and including the cutting edges 20 extending parallel with the axis of said roll 2 and cutting edges 21 extending circumferentially transversely with respect to said axis.

As shown in Figs. II, III and IV; the transverse cutting edges 15 of the male die element 12 are of radially increasing curvature from their ends which are circumferentially front, (with reference to the direction of rotation of said roll 1, indicated by the arrow in Fig. II), toward their rear ends, and are substantially coincident with the pitch line 23 between said rolls 1 and 2 at their front ends and of greater radial extent at their rear ends. The transverse cutting edges of the female die element 20 are inclined in the opposite direction; being substantially coincident with said pitch line at their rear ends and of greater radial extent at their front ends; whereby, upon rotary movement of said rolls, said male die element projects within said female die element, beyond said pitch line, at the first encounter of said elements, as exemplified in Fig. II, and said female die element overlaps said male die element, beyond said pitch line, at the last encounter of said elements, as exemplified in Fig. IV. Said cutting edges 15 and 21 each project radially beyond said pitch line and overlap each other intermediate of their length as exemplified in Fig. III. The effect of such construction and arrangement is that during the initial cutting action of said dies, illustrated in Fig. II, the portion of the paper, or other fabric 25 which is being punched, which extends rearwardly from the front cutting edge 14 of the male die 12, is supported by said edge at the pitch line, but the portion of said fabric in advance of said front cutting edge 14 is thrust radially toward the axis of said roll 1, by the projection of the front cutting edge 20 of the female die 17 radially beyond said pitch line, so as to effect such shearing movement of said edges and said fabric radially with respect to the axes of said rolls 1 and 2 as to insure a clean cut of said fabric throughout the length of said front cutting edges 14 and 20 which, at their axially opposite ends, merge into the transverse cutting edges 15 and 21; and such shearing movement is continued by said transverse cutting edges, which, as they are turned circumferentially, shift radially with respect to said pitch line, at their coöperative cutting point, to thrust said fabric in radially opposite directions upon respectively opposite sides of the cutting line until when the rear cutting edges 14 and 20, which are respectively parallel with the axes of said rolls 1 and 2, are presented to said fabric, the portion of the latter extending rearwardly from said edges, is supported at the pitch line by the die element 17, while the portion thereof extending forwardly from said edges is thrust radially toward the axis of the roll 2 by the projection of the rear cutting edge 14 of said die 12 radially beyond said pitch line, as indicated in Fig. IV, thus cleanly cutting said fabric throughout the entire perimeter of the opening punched in said fabric by the coöperative scissor like action of said dies throughout the entire extent of their cutting edges.

I find in practice that the difference in radial extent of the front and rear ends of the transverse cutting edges above described may be approximately one-sixteenth of an inch and that their short ends may be of slightly less radial extent than said pitch line. However, it is to be understood that it is not essential that the transverse cutting edges shall be continuously curved as illustrated in the drawing; the essential feature being that said edges shall extend oppositely obliquely with reference to the pitch line between the die elements, tangentially with respect to arcs of the turning movement of said elements which are respectively concentric with their axes.

Although I have illustrated my invention as embodied in rolls having parallel axes, it is to be understood that it may be embodied in rolls with axes otherwise arranged; for instance, the axes of the rolls may be inclined with respect to each other in a common plane or disposed in oblique relation to each other in different planes.

Therefore, I do not desire to limit myself to the precise proportions nor to the specific construction and arrangement of my invention herein set forth, as it is obvious that various modifications may be made therein without departing from the essential features of my invention as defined in the appended claims.

I claim:—

1. In rotary punching mechanism, the combination with two rolls having their axes parallel; of male and female die elements respectively carried by said rolls including cutting edges extending circumferentially transversely to the axes of said rolls; the cutting edges upon one of said elements being substantially coincident with the pitch line between the rolls at their front ends and of greater radial extent at their rear ends; and the cutting edges upon the other of said elements being substantially coincident with said pitch line at their rear ends and of greater radial extent at their front ends.

2. Punching mechanism including opposed die elements mounted for relative turning movement with respect to parallel axes and having cutting edges extending transversely with respect to said axes and respectively oppositely of radially increasing curvature.

3. Punching mechanism including opposed die elements mounted for relative turning movement with respect to parallel axes and having cutting edges extending transversely with respect to said axes and respectively extending in oppositely oblique relation to a circular pitch line between them.

4. Punching mechanism including die elements mounted for turning movement relatively to independent but parallel axes and having overlapping cutting edges extending transversely with respect to said axes and oppositely tangentially with respect to circular arcs of their turning movement; the circumferentially opposite ends of said cutting edges being respectively substantially coincident with the pitch line between them, and projected radially beyond said line.

5. In rotary punching mechanism, the combination with two rolls; of male and female die elements respectively carried by said rolls including cutting edges extending circumferentially transversely to the axes of said rolls; the cutting edges upon one of said elements being substantially coincident with the pitch line between the rolls at their front ends and of greater radial extent at their rear ends; and the cutting edges upon the other of said elements being substantially coincident with said pitch line at their rear ends and of greater radial extent at their front ends.

6. Punching mechanism including opposed die elements mounted for relative turning movement and having cutting edges extending transversely with respect to their axes and respectively oppositely of radially increasing curvature.

7. Punching mechanism including opposed die elements mounted for relative turning movement and having cutting edges extending transversely with respect to their axes and respectively extending in oppositely oblique relation to a circular pitch line between them.

8. Punching mechanism including die elements mounted for turning movement relatively to independent axes and having overlapping cutting edges extending transversely with respect to said axes and oppositely tangentially with respect to circular arcs of their turning movement; the circumferentially opposite ends of said cutting edges being respectively substantially coincident with the pitch line between them, and projected radially beyond said line.

9. In rotary punching mechanism, the combination with two rolls having their axes parallel; of male and female die elements respectively carried by said rolls, including cutting edges parallel to the axes of said rolls, the front cutting edge of said male die element being substantially coincident with the pitch line between the rolls and the rear edge being of greater radial extent; the rear cutting edge of said female die element being substantially coincident with said pitch line and the front edge of greater radial extent, whereby upon rotary movement of said rolls, said male die element projects within the female die element, beyond said pitch line, at the first encounter of said elements, and said female die element overlaps said male die element, beyond said pitch line at the last encounter of said elements.

In testimony whereof, I have hereunto signed my name at Bordentown, New Jersey, this thirteenth day of March, 1915.

GEORGE W. SWIFT, Jr.

Witnesses:
R. C. HUTCHINSON,
PHILIP MATTHEWS.